US011619492B2

(12) United States Patent
Avantaggiati

(10) Patent No.: US 11,619,492 B2
(45) Date of Patent: Apr. 4, 2023

(54) SENSOR LINEARIZATION BASED UPON CORRECTION OF STATIC AND FREQUENCY-DEPENDENT NON-LINEARITIES

(71) Applicant: INVENSENSE, INC., San Jose, CA (US)

(72) Inventor: Vito Avantaggiati, Rome (IT)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 17/344,525

(22) Filed: Jun. 10, 2021

(65) Prior Publication Data

US 2022/0397395 A1    Dec. 15, 2022

(51) Int. Cl.
*G01C 19/5776* (2012.01)
*G01P 15/08* (2006.01)

(52) U.S. Cl.
CPC .......... *G01C 19/5776* (2013.01); *G01P 15/08* (2013.01)

(58) Field of Classification Search
CPC ............................. G01C 19/5776; G01P 15/08
USPC .......................................................... 73/497
See application file for complete search history.

(56) References Cited

U.S. PATENT DOCUMENTS

| 8,872,683 | B2 | 10/2014 | Ismail et al. |
| 10,139,227 | B2 | 11/2018 | Thompson |
| 11,047,685 | B2 | 6/2021 | Anae et al. |
| 2014/0250971 | A1* | 9/2014 | Fang ...................... G01P 15/125 73/1.37 |
| 2014/0260508 | A1* | 9/2014 | Dar ........................ B81C 99/003 73/1.01 |
| 2014/0266246 | A1* | 9/2014 | Debeurre .............. B81C 99/005 324/601 |
| 2018/0274941 | A1* | 9/2018 | Quartiroli .......... G01C 19/5776 |
| 2019/0241427 | A1 | 8/2019 | Manosalvas-Kjono et al. |

\* cited by examiner

*Primary Examiner* — Lee E Rodak
*Assistant Examiner* — Byung Ro Lee
(74) *Attorney, Agent, or Firm* — Haley Guiliano LLP; Joshua Van Hoven; Stefan D. Osterbur

(57) ABSTRACT

Methods and systems for compensation of a microelectromechanical system (MEMS) sensor may include associating test temperature values with input test signal values, identifying temperature-input signal pairs, and applying one of the test temperature values and one of the test signal values to the MEMS sensor. Desired output signal values may be determined, with each of the desired output signal values corresponding to one of the applied temperature-input signal pairs. Measured output signal values from the MEMS sensor may be measured, with each of the measured output signal values corresponding to one of the applied temperature-input signal pairs. Compensation terms may be determined based on the plurality of temperature-input signal pairs, the corresponding plurality of measured output signal values, and the corresponding plurality of desired output signal values. Compensation terms may be used to modify a sense signal of the MEMS sensor.

20 Claims, 16 Drawing Sheets

| Test # | Temperature-Input Pair | | | Resultant/Desired |
|---|---|---|---|---|
| | Temperature [°C] | Orientation [gee] | Self Test [gee] | Total Acceleration [gee] |
| 1 | -40 | 1 | 6 | 7 |
| 2 | -40 | 1 | -3 | -2 |
| 3 | -40 | 1 | 3 | 4 |
| 4 | -40 | 1 | -6 | -5 |
| 5 | -40 | 1 | 0 | 1 |
| 6 | -40 | 0 | -6 | -6 |
| 7 | -40 | 0 | 3 | 3 |
| 8 | -40 | 0 | -3 | -3 |
| 9 | -40 | 0 | 6 | 6 |
| 10 | -40 | 0 | 0 | 0 |
| 11 | -40 | -1 | -6 | -7 |
| 12 | -40 | -1 | 3 | 2 |
| 13 | -40 | -1 | -3 | -4 |
| 14 | -40 | -1 | 6 | 5 |
| 15 | -40 | -1 | 0 | -1 |
| 16 | 25 | -1 | -6 | -7 |
| 17 | 25 | -1 | 3 | 2 |
| 18 | 25 | -1 | -3 | -4 |
| 19 | 25 | -1 | 6 | 5 |
| 20 | 25 | -1 | 0 | -1 |
| 21 | 25 | 0 | 6 | 6 |
| 22 | 25 | 0 | -3 | -3 |
| 23 | 25 | 0 | 3 | 3 |
| 24 | 25 | 0 | -6 | -6 |
| 25 | 25 | 0 | 0 | 0 |
| 26 | 25 | 1 | 6 | 7 |
| 27 | 25 | 1 | -3 | -2 |
| 28 | 25 | 1 | 3 | 4 |
| 29 | 25 | 1 | -6 | -5 |
| 30 | 25 | 1 | 0 | 1 |

FIG. 5

| Test # | Temperature-Input Pair | | | Resultant/ Desired |
|---|---|---|---|---|
| | Temperature [°C] | Orientation [gee] | Self Test [gee] | [gee] |
| 31 | 110 | 1 | -6 | -5 |
| 32 | 110 | 1 | 3 | 4 |
| 33 | 110 | 1 | -3 | -2 |
| 34 | 110 | 1 | 6 | 7 |
| 35 | 110 | 1 | 0 | 1 |
| 36 | 110 | 0 | -6 | -6 |
| 37 | 110 | 0 | 3 | 3 |
| 38 | 110 | 0 | -3 | -3 |
| 39 | 110 | 0 | 6 | 6 |
| 40 | 110 | 0 | 0 | 0 |
| 41 | 110 | -1 | -6 | -7 |
| 42 | 110 | -1 | 3 | 2 |
| 43 | 110 | -1 | -3 | -4 |
| 44 | 110 | -1 | 6 | 5 |
| 45 | 110 | -1 | 0 | -1 |

FIG. 5 (Contd.)

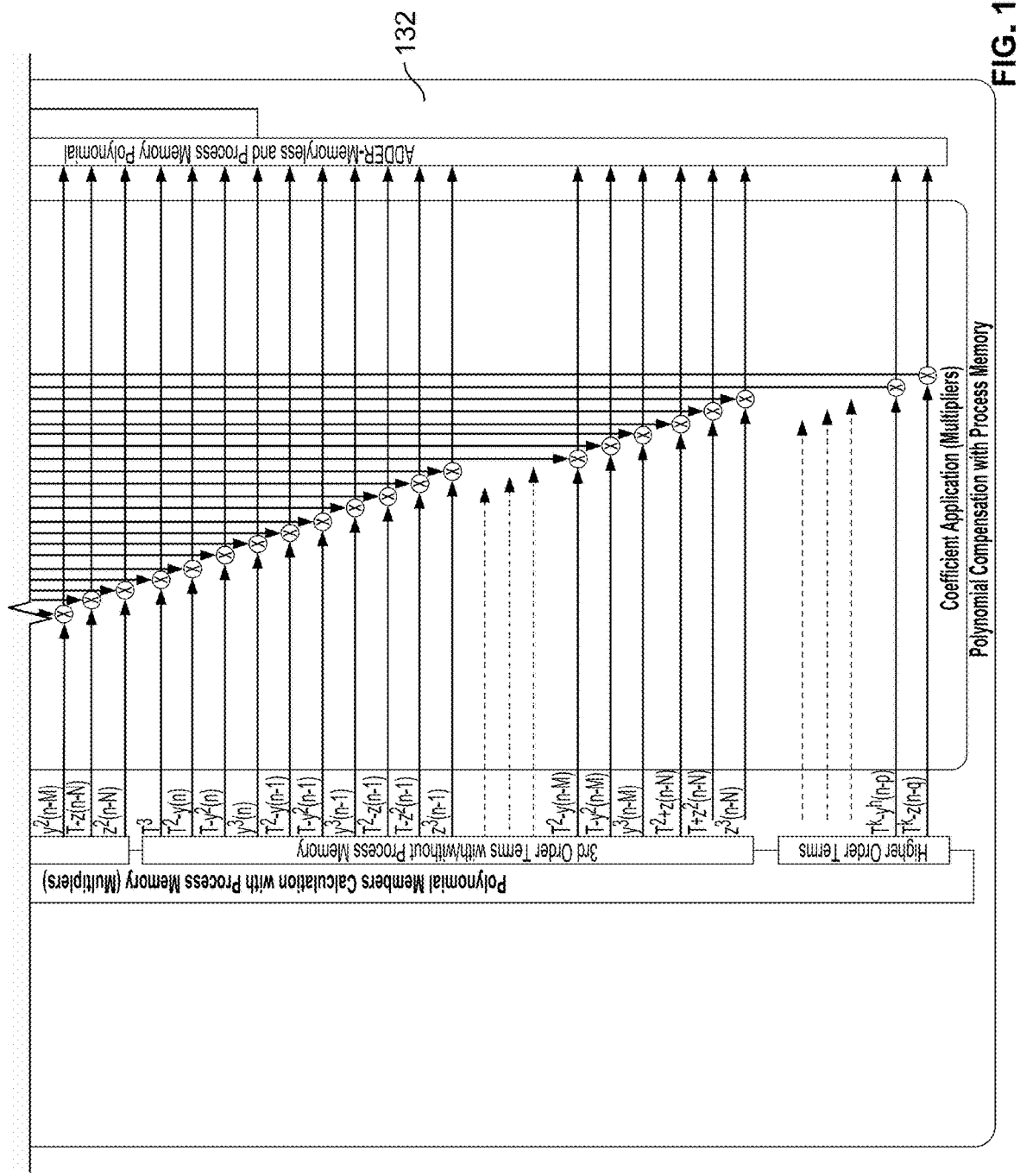
FIG. 11(cont..)

SENSOR LINEARIZATION BASED UPON CORRECTION OF STATIC AND FREQUENCY-DEPENDENT NON-LINEARITIES

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

Motion sensors such as accelerometers and gyroscopes may be manufactured as microelectromechanical (MEMS) sensors that are fabricated using semiconductor manufacturing techniques. A MEMS sensor may include movable proof masses that can respond to forces such as linear acceleration (e.g., for MEMS accelerometers), angular velocity (e.g., for MEMS gyroscopes), and magnetic field. The operation of these forces on the movable proof masses may be measured based on the movement of the proof masses in response to the forces. In some implementations, this movement is measured based on distance between the movable proof masses and sense electrodes, which form capacitors for sensing the movement.

MEMS sensors are generally affected by variations in temperature and signal amplitude, in some cases resulting in a nonlinear effect on sensor accuracy. This effect may generate an offset or error in the MEMS sensor. Under higher amplitude vibrations these errors can cause frequency-variant non-linearities that are not adequately compensated by known corrections strategies employing a fixed or static methodology.

SUMMARY

At least some example illustrations herein are directed to a method for compensation of a microelectromechanical system (MEMS) sensor. The method includes associating a plurality of test temperature values with a plurality of input test signal values; identifying, based on the associating, a plurality of temperature-input signal pairs; and applying, for each of the temperature-input signal pairs, one of the plurality of test temperature values and one of the plurality of test signal values to the MEMS sensor. The method further includes determining a plurality of desired output signal values, wherein each of the desired output signal values corresponds to one of the applied temperature-input signal pairs, and measuring a plurality of measured output signal values from the MEMS sensor, wherein each of the measured output signal values corresponds to one of the applied temperature-input signal pairs. The method further includes determining, based on the plurality of temperature-input signal pairs, the corresponding plurality of measured output signal values, and the corresponding plurality of desired output signal values, a plurality of compensation terms. Additionally, the method includes providing the plurality of compensation terms for storage at the MEMS sensor, wherein a sense signal of the MEMS sensor is modified based on the plurality of compensation terms.

At least some example illustrations herein are directed to a compensating system for a microelectromechanical (MEMS) sensor. The compensating system includes a processor in communication with the MEMS sensor and having a temperature measurement input, and a memory in communication with the processor. The memory includes digital data stored on the memory, with the digital data comprising a plurality of test temperature values associated with a plurality of input test signal values. The digital data also includes instructions tangibly embodied in the memory, with the instructions configured to cause the processor to identify, based upon the associated test temperature values and input test signal values, a plurality of temperature-input signal pairs. The instructions are also configured to cause the processor to apply, for each of the temperature-input signal pairs, one of the plurality of test temperature values and one of the plurality of test signal values to the MEMS sensor output; to determine a plurality of desired output signal values, wherein each of the desired output signal values corresponds to one of the applied temperature-input signal pairs; to measure a plurality of measured output signal values from the MEMS sensor, wherein each of the measured output signal values corresponds to one of the applied temperature-input signal pairs; to determine, based on the plurality of temperature-input signal pairs, the corresponding plurality of measured output signal values, and the corresponding plurality of desired output signal values, a plurality of compensation terms; and to provide the plurality of compensation terms for storage at the MEMS sensor, wherein a sense signal of the MEMS sensor is modified based on the plurality of compensation terms.

BRIEF DESCRIPTION OF DRAWINGS

The above and other features of the present disclosure, its nature and various advantages will be more apparent upon consideration of the following detailed description, taken in conjunction with the accompanying drawings in which:

FIG. 5 shows an illustrative table of temperature-input signal pairs and desired output signals for a MEMS sensor, in accordance with some embodiments of the present disclosure;

DETAILED DESCRIPTION

Figure 1:
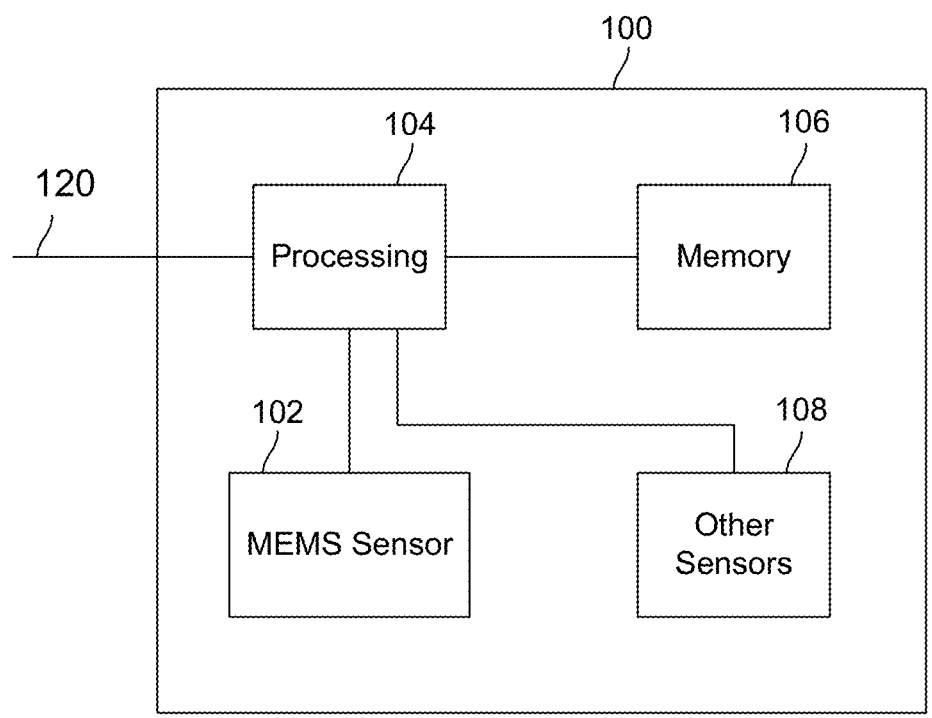
FIG. 1 shows an illustrative motion sensing system in accordance with an embodiment of the present disclosure.

Generally, the output of a MEMS sensor (e.g., an accelerometer or gyroscope) may be affected by temperature and signal amplitude non-linearly, i.e., magnitude of error introduced by temperature and/or signal amplitude is not proportional to these factors. These errors present challenges in applications requiring robust resistance to vibration-introduced error, e.g., automotive applications, or any other applications involving significant vibrational loads. Additionally, known compensating strategies employing a piecewise linear approach are generally insufficient to correct non-linear errors. For example, compensating "static" sensitivity and offset variations in temperature does not compensate for frequency dependent non-linearity. In some cases, offsets introduced by temperature or amplitude may be interpreted as signals by a MEMS sensor, resulting in vibration rectification error (VRE). As a result, known compensating approaches generally do not adequately compensate non-linear error, particularly when strong aggressors, e.g., extreme temperature and/or vibration, are applied. Non-linearity errors may be memoryless or memory dependent.

Accordingly, example methods and systems herein may compensate the output of a sensor in a microelectromechanical system (MEMS) based upon temperature and/or amplitude. In at least some example approaches, test temperature values may be associated with a plurality of input test signal values, e.g., in a training process. In an example training process, input test signal values may be input to a MEMS sensor, such as via a test fixture. The input test signals may be input to the MEMS sensor at different test temperatures. Output from the MEMS sensor may be measured for different pairs of input test signal values and temperatures. Desired output signal values may be determined for each of the temperature-input signal pairs, and compared with measured output signal values from the MEMS sensor for the temperature-input signal pairs. Based upon this comparison, compensation terms may be determined. The compensation terms may be stored at the MEMS sensor, or otherwise used by the MEMS sensor to modify an output of the MEMS sensor.

In at least some example approaches herein, compensation terms may be employed in a model-based compensating strategy, which is based upon a polynomial formula for compensating error. The polynomial formula may be used to derive terms that in turn compensate for sources of linear and non-linear variation of offset and sensitivity. Depending on the complexity of the compensation to be performed, different quantities of input signal values (e.g., movement or vibration) and temperature values are applied to the MEMS sensor and are also used as input variables to the compensating polynomial function. Additionally, polynomial compensation may be used jointly to a fixed or adaptive equalization, e.g., to compensate for memory-dependent non-linearities.

Example compensation strategies herein may facilitate a MEMS system that is configured to self-test or self-calibrate by identifying and selecting compensation terms of a compensation model or function based upon a plurality of temperature-input signal pairs. More specifically, a plurality of temperature-input signal pairs may be input to a MEMS device, e.g., a MEMS accelerometer or gyroscope, to determine (a) terms of greatest relevance in a system of equations, and (b) coefficients for the terms. Accordingly, example compensation functions herein may be configured in a manner that a MEMS sensor employing the compensation function is configured to self-test to determine relevant compensation terms and coefficients for the compensation terms.

FIG. 1 depicts an exemplary motion sensing system 100 in accordance with some embodiments of the present disclosure. Although particular components are depicted in FIG. 1, it will be understood that other suitable combinations of sensors, processing components, memory, and other circuitry may be utilized as necessary for different applications and systems. In an embodiment as described herein, the motion sensing system may include at least a MEMS sensor 102 (e.g., a single- or multi-axis accelerometer for measuring linear acceleration along one or more axes, a single- or multi-axis gyroscope for measuring linear acceleration about one or more axes, a pressure sensor, a microphone, or an ultrasonic fingerprint sensor) and supporting circuitry, such as processing circuitry 104 and memory 106. In some embodiments, one or more additional sensors 108 (e.g., MEMS gyroscopes, additional MEMS accelerometers, MEMS microphones, MEMS pressure sensors, temperature sensors, and a compass) may be included within the motion processing system 100 to provide an integrated motion processing unit ("MPU") (e.g., including 3 axes of MEMS gyroscope sensing, 3 axes of MEMS accelerometer sensing, microphone, pressure sensor, and compass).

Processing circuitry 104 may include one or more components providing necessary processing based on the requirements of the motion processing system 100. In some embodiments, processing circuitry 104 may include hardware control logic that may be integrated within a chip of a sensor (e.g., on a substrate or capacitor of a MEMS accelerometer 102 or other sensor 108, or on an adjacent portion of a chip to the MEMS accelerometer 102 or other sensor 108) to control the operation of the MEMS accelerometer 102 or other sensors 108 and perform aspects of processing for the MEMS accelerometer 102 or other sensors 108. In some embodiments, the MEMS accelerometer 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS accelerometer 102 by interacting with the hardware control logic, and process signals received from MEMS sensor 102. The microprocessor may interact with other sensors in a similar manner. In some embodiments, the microprocessor may include an application specific integrated circuit ("ASIC") that may be located at a suitable location within one or more of the MEMS sensor 102, other sensors 108, and or adjacent components in communication therewith.

Although in some embodiments (not depicted in FIG. 1), the MEMS accelerometer 102 or other sensors 108 may communicate directly with external circuitry (e.g., via a serial bus or direct connection to sensor outputs and control inputs), in an embodiment the processing circuitry 104 may process data received from the MEMS accelerometer 102 and other sensors 108 and communicate with external components via a communication interface 120 (e.g., a SPI or I2C bus, in automotive applications a controller area network (CAN) or Local Interconnect Network (LIN) bus, or in other applications suitable wired or wireless communications interfaces as is known in the art). The processing circuitry 104 may convert signals received from the MEMS accelerometer 102 and other sensors 108 into appropriate measurement units (e.g., based on settings provided by other computing units communicating over the communication bus 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS accelerometer 102 or other MEMS sensors 108.

In some embodiments, certain types of information may be determined based on data from multiple MEMS inertial sensors 102 and other sensors 108, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

An exemplary MEMS accelerometer 102 may include one or more movable proof masses that are configured in a manner that permits the MEMS sensor to measure a desired force (e.g., linear acceleration or angular velocity) along or about an axis. In some embodiments, the one or more movable proof masses may be suspended from anchoring points, which may refer to any portion of the MEMS sensor which is fixed, such as an anchor that extends from a layer (e.g., a CMOS layer) that is parallel to the MEMS layer of the device, a frame of the MEMS layer of the device, or any other suitable portion of the MEMS device that is fixed relative to the movable proof masses. The proof masses may be arranged in a manner such that they move in response to measured force. The movement of the proof masses relative to a fixed surface (e.g., a fixed sense electrode extending into the MEMS layer or located parallel to the proof mass on the substrate) in response to the measured force is measured and scaled to determine the desired inertial parameter.

Figure 2:
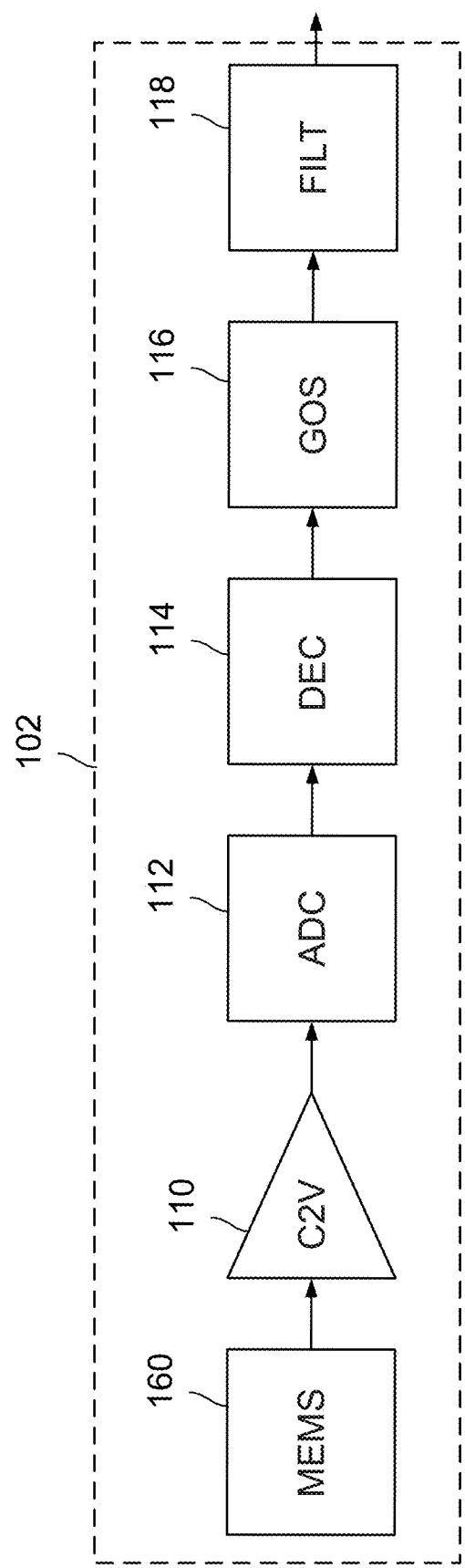
FIG. 2 shows a block diagram of an exemplary MEMS sensor in accordance with some embodiments of the present disclosure.

FIG. 2 shows a block diagram of an exemplary MEMS sensor 102 in accordance with some embodiments of the present disclosure. Although particular components are depicted in a particular configuration in FIG. 2, it will be understood that in some embodiments one or more of the present components may be modified, omitted, combined, or substituted. For example, in an embodiment (not depicted herein), aspects of the signal processing after analog-to-digital conversion (e.g., at ADC 112) may be performed at circuitry that is separate from (e.g., adjacent to) the MEMS sensor 102. In other embodiments, additional filtering steps may be performed or filtering may be performed at different stages of the processing (e.g., analog filtering). In some embodiments, certain operations (e.g., analog-to-digital conversion 112, decimation 114, gain-offset-scaling 116, and digital filtering 118) are performed by processing circuitry.

The MEMS sensor includes a MEMS electromechanical structure 160 which is configured for a particular sensing operation. For example, a MEMS inertial sensor such as an accelerometer or gyroscope includes one or more movable proof masses suspended within a MEMS layer of the sensor (e.g., as a suspended spring-mass system) in a manner that facilitates movement in response to the force to be measured (e.g., linear acceleration or angular velocity). Although other sensing methods may be used in other embodiments, capacitive sensing may be used to sense the movement of the proof masses relative to fixed sense electrodes. The capacitances representative of the relative location of the proof masses is converted into an appropriate analog signal (e.g., having a voltage or current representative of the capacitance) capacitance-to-voltage (C2V) converter 110. The MEMS electromechanical structure 160 may output a capacitance, thereby indicating a position of a proof mass (not shown in FIG. 2) of the MEMS electromechanical structure 160 relative to an anchor (not shown in FIG. 2) of the MEMS electromechanical structure 160. The C2V converter 110 generally translates charge or capacitance variations in the output of the MEMS electromechanical structure 160 to an output voltage.

The voltage output of the amplifier 110 may be input to an analog-digital converter (ADC) 112, which converts the input analog voltage representative of the state of the MEMS electromechanical structure 160 into a digital signal. The output from the ADC 112 may be supplied to a decimator 114. The decimator 114 generally reduces a bit rate from the ADC output sampling frequency to the signal path rate. The decimator 114 may be linked with a gain-offset-scaling (GOS) circuit 116, which provides a variety of compensation to facilitate use of the signal to calculate output values, such as compensating for component variation, mitigating temperature-dependent effects, or modifying sensor scaling over time as components age. The output from the GOS 116 may be provided to a filter(s) 118. The filter 118 may generally be applied to fit desired requirements with respect to band and/or noise levels of the output signal. An output signal from MEMS sensor 102 (e.g., from filter 118) may generally correspond to a digital signal representative of the measured parameter.

Figure 3:
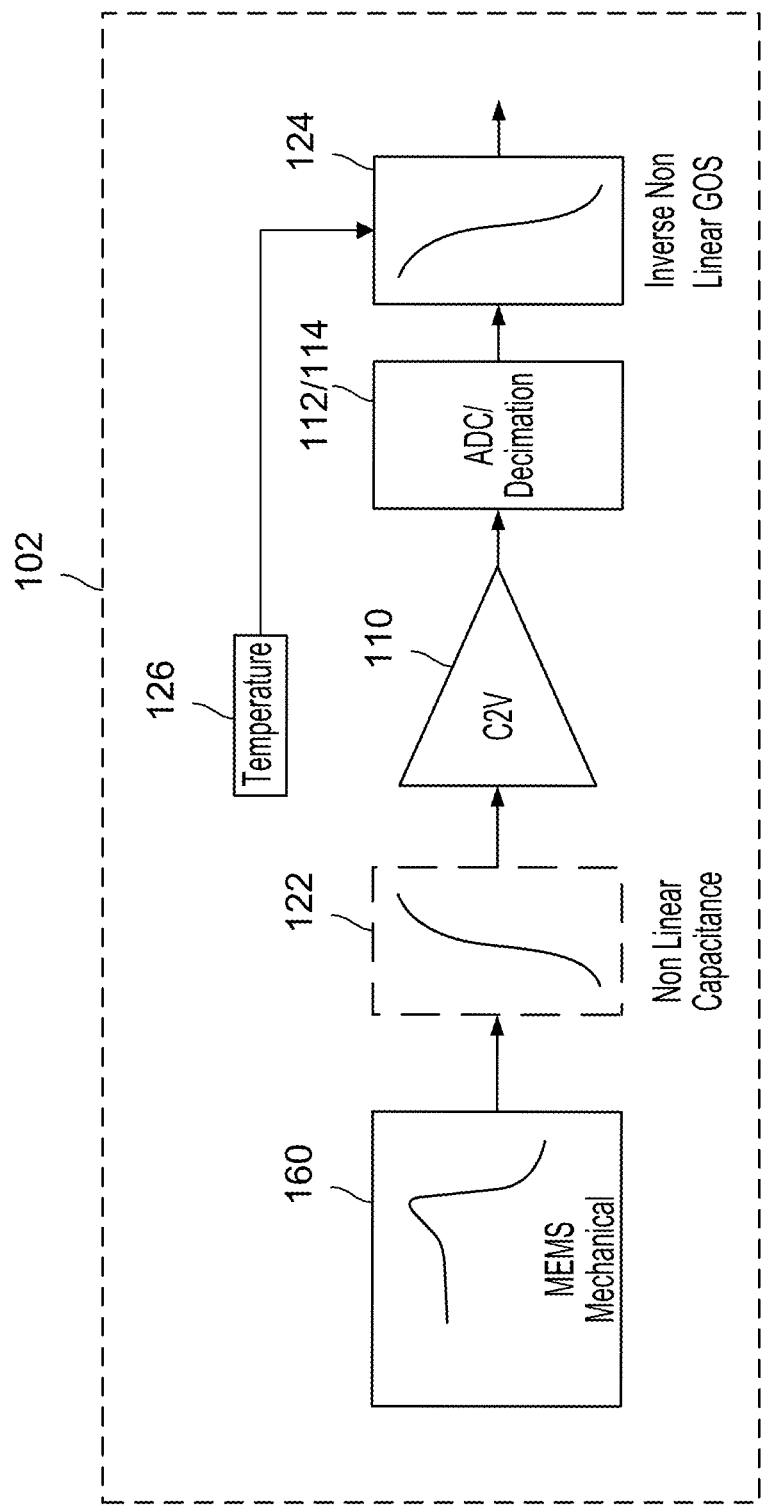
FIG. 3 shows an exemplary MEMS sensor including non-linear signal processing, in accordance with some embodiments of the present disclosure.

FIG. 3 shows an exemplary MEMS sensor including non-linear signal processing, in accordance with some embodiments of the present disclosure. In the embodiment of FIG. 3, certain components such as MEMS electromechanical structure 160, C2V converter 110, and ADC 112 and decimation 114 (combined for ease of depiction in FIG. 3) are denoted by similar reference numerals. An exemplary mechanical response of the MEMS electromechanical structure 160 is depicted in FIG. 3, as is a non-linear response 122 of the capacitor that is based on movement of the MEMS electromechanical structure 160. The combined effect of these mechanical and capacitive responses is a complex non-linear combination of the signals that may be distort the output of the MEMS sensor unless properly compensated. In the embodiment depicted in FIG. 3, this compensation is performed by an inverse non-linear GOS circuit 124 of processing circuitry, which functions as described herein. In some embodiments, this inverse non-linear GOS 124 receives as in input the output of a temperature sensor 126 (e.g., an on-board temperature sensor as depicted in FIG. 3, or a signal from an external sensor). Although filtering is not depicted in FIG. 3, and in some embodiments inverse non-linear GOS 124 may obviate the need for additional filtering, in some embodiments one or more analog and/or digital filters may be included in the MEMS sensor 102 of FIG. 3.

MEMS non-linear behavior may be compensated using a bi-dimensional polynomial law or relationship, thereby fully or partially compensating for temperature and amplitude inaccuracy, and both linear and non-linearities. For example, an inversion polynomial may linearize a stationary and memoryless non-linearity output by the MEMS electromechanical structure 160. The polynomial compensation law may be temperature dependent, and the composition of MEMS non-linearity with the polynomial formula provides the expected desired linear sensitivity, independent from temperature, as described herein.

Compensation for the MEMS sensor 102, e.g., via the inverse non-linear GOS 124, may in some example approaches be applied by way of a compensation function that is based upon a testing or training process. In this process, a plurality of known temperature-input pairs may be provided to the MEMS sensor 102, and an output of the MEMS sensor 102 may be compared with a desired output. Results of this comparison may be stored, e.g., within MEMS sensor 102, and used to determine a compensation function that compensates subsequent outputs of the MEMS sensor 102. The compensation function may be adjusted based upon temperature and/or amplitude measurements taken during subsequent operation of the MEMS sensor 102.

Figure 4:
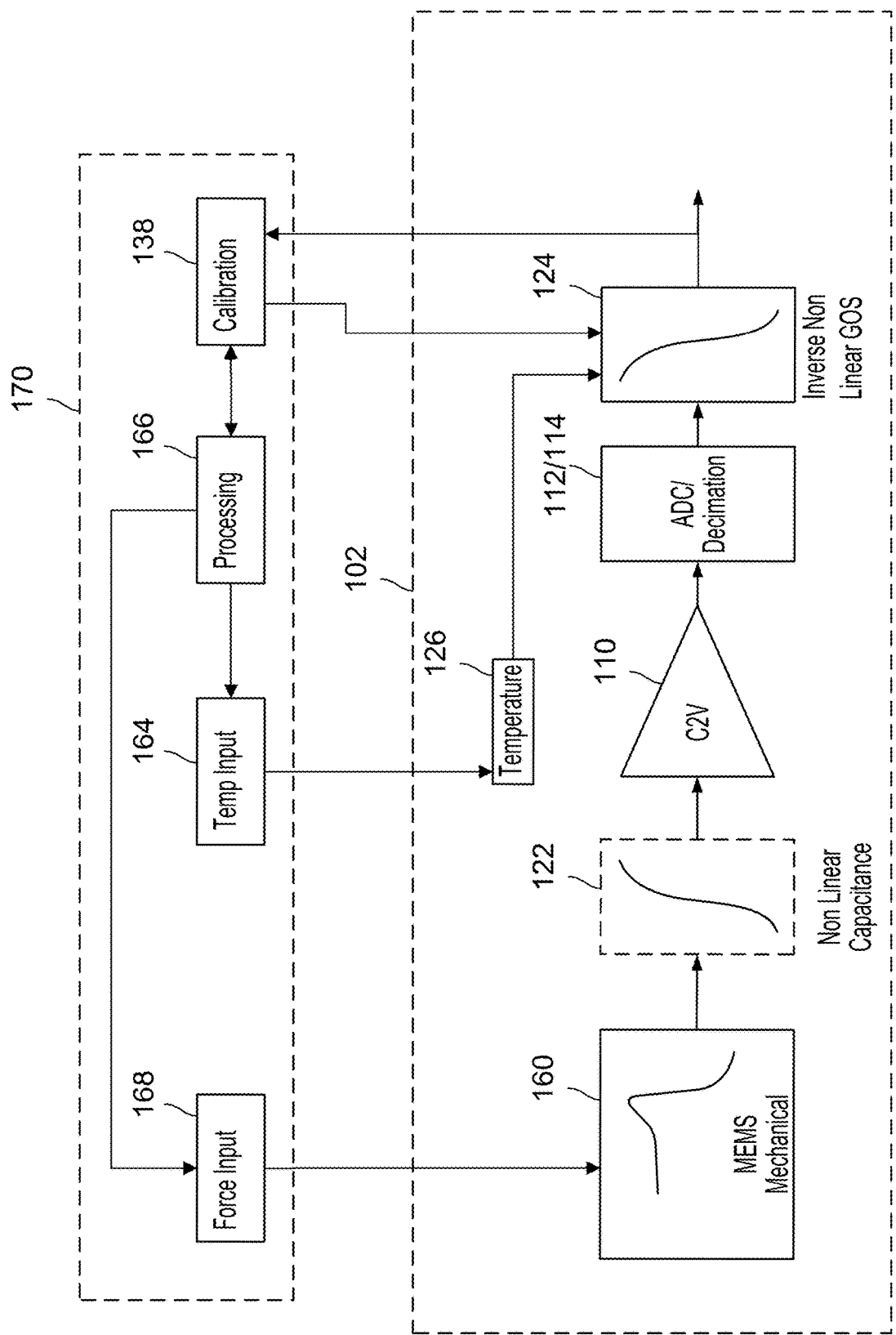
FIG. 4 shows an exemplary MEMS sensor including non-linear signal processing and a calibration system, in accordance with some embodiments of the present disclosure.

FIG. 4 depicts an exemplary MEMS sensor including non-linear signal processing and a calibration system, in accordance with some embodiments of the present disclosure. MEMS sensor 102 of FIG. 4 is identical to the MEMS sensor 102 of FIG. 3, except that in the exemplary embodiment of FIG. 4 the MEMS sensor 102 interacts with a calibration system 170. A calibration system 170 may be suitable hardware and software such as a test system that imparts certain conditions on the MEMS sensor 102, such as particular combinations of applied forces, device orientations, and MEMS sensor 102 temperatures. For example, a calibration system 170 may include a test fixture that applies physical stimuli to the MEMS sensor 102 and applies combinations of temperature and input signal (e.g., applied force and orientation) pairs to the MEMS sensor 102. The calibration signal also measures output signal from the MEMS sensor 102, such as by receiving the MEMS sensor 102 output signal or querying the MEMS sensor 102 for particular intermediate sensor values. The measured output signals are associated with the temperature-input signal pairs, and once an appropriate number of such measurements are performed, compensation values may be identified. In some embodiments, the compensation values may be provided to the MEMS sensor 102 directly by the calibration system 170.

For example, an exemplary calibration system 170 may include a temperature input 164, calibration circuitry 138, processing circuitry 166, and force input 168. Exemplary force input 168 may apply a force to apply a particular movement to the MEMS electromechanical structure 160, such as by causing a movement of a fixture that is holding the MEMS sensor 102 such that the MEMS sensor 102 is oriented in a particular manner and experiences a particular predetermined force. In some embodiments the force may be applied internally by the sensor, such as by controlling the operation of test electrodes that impart motion directly on the proof mass and/or suspended proof mass system.

Temperature input 164 may apply a temperature to the MEMS sensor 102 for a suitable period (e.g., such that the MEMS sensor 102 reaches a desired temperature) and/or impart particular temperature patterns on the MEMS sensor (e.g., corresponding to a rate-of-change of temperature to be used for calibration). Calibration circuitry 138 receives measured values from the MEMS sensor 102, associates those measured values with the corresponding force and temperature values, and calculates compensation terms, as described herein. In the embodiment depicted in FIG. 4, calibration circuitry 138 also provides the compensation terms directly to the inverse non-linear GOS 124 for future use in processing sensed signals in the field, although in some embodiments the compensation terms may be loaded into the inverse non-linear GOS 124 during later processing, manufacturing, or QC steps. Processing circuitry 166 may communicate with and coordinate the operations of the other components of calibration system 170.

FIG. 5 shows an illustrative table of temperature-input signal pairs and desired output signals for a MEMS sensor, in accordance with some embodiments of the present disclosure, which may be employed in training or determining compensation terms and/or a compensation function. The table generally provides a plurality of different test parameters to apply to a MEMS sensor, e.g., MEMS sensor 102, using different temperatures, amplitudes, and orientations of the sensor in a design-of-experiments (DoE).

A plurality of different temperatures, input force (e.g., acceleration) magnitudes, and orientations may be selected for a DoE based upon an expected a range of conditions for a given application. The table of FIG. 5 includes three input temperatures (−40 degrees Celsius, 25 degrees Celsius, and 110 degrees Celsius), three input orientations (−1 g, 0 g, and 1 g), and five input acceleration magnitudes (−6 g, −3 g, 0 g, 3 g, and 6 g), resulting in 45 separate temperature-input pairs. Temperature-input pair as used herein may generally refer to a pairing of (a) an ambient temperature of a MEMS sensor and (b) a force input (e.g., a linear acceleration input). The linear acceleration input may result from an input signal and an orientation of the MEMS sensor 102, as described herein. The temperature-input pairs may be applied to MEMS sensor 102, e.g., in a test fixture. Output of the MEMS sensor 102 may be compared with expected or desired output accelerations based upon the known temperature, orientation, and amplitude input. As noted above, variables for a DoE (in this example, temperature, input acceleration magnitude, and orientation) may be selected based upon an expected range for a given application. The example variables shown in FIG. 5 are directed to an automotive application, but other applications may require different ranges, number of variables, or even different variables. The three input temperatures of FIG. 5 represent a minimum temperature of −40 degrees Celsius, a nominal operating temperature of 25 degrees Celsius, and a maximum temperature of 110 degrees Celsius. Similarly, the three orientations represent the MEMS sensor 102 being positioned such that (a) gravity is applied in addition to the input acceleration (i.e., +1 g), (b) gravity is perpendicular to the orientation of the MEMS sensor 102 (i.e., 0 g is added to the input), and (3) gravity works in an opposite direction and is subtracted from the input acceleration (i.e., −1 g). Additionally, the five input accelerations include maximum positive/negative acceleration inputs (+/−6 g) and a nominal positive/negative acceleration inputs (+/−3 g), as well as a zero-acceleration input (i.e., 0 g) to the MEMS sensor 102.

As also shown in FIG. 5, desired or expected outputs of MEMS sensor 102 may be determined from the known temperature-input signal pairs. In the examples illustrated in FIG. 5, each expected output is based upon the combination of the orientation and test input (e.g., 1 g+6 g=7 g, in test number 1). Desired outputs may be compared with an output of the MEMS sensor 102 under test or training conditions, and used to determine compensation terms for the MEMS sensor 102.

As will be discussed further below, the various temperature-input signal pairs such as illustrated in FIG. 5 may be used to determine compensation terms. As will also be elaborated below, compensation terms may include numerical values or coefficients for an equation or function configured to adjust the output of a MEMS sensor 102. The function adjusting the output of the MEMS sensor 102 may also adjust MEMS sensor 102 output based upon one or more variables, e.g., temperature. The variable(s) may be used in a calibration process including DoE testing, such as the example discussed above. In some approaches, compensation or adjustment of MEMS sensor 102 output may be based at least in part upon application of a predefined error limit. In other words, compensation may be performed selectively, such as in response to a determination that output of a MEMS sensor 102 exceeds a predefined error limit.

Compensation or adjustment of the MEMS sensor 102 output may be based in part upon a comparison of MEMS sensor 102 output with a desired or expected output during a calibration or training process, such as in the example approach discussed above regarding FIG. 5. Coefficients of a compensation function or equation may be determined based upon the comparison(s), with the compensation applied to subsequent MEMS sensor 102 output.

In some examples, compensation terms may include a numerical coefficient that is applied to one or more terms of a compensation function. A compensation function may include, merely as one example, a polynomial expression that associates the plurality of compensation terms to temperature values and test signal values. In these examples, a compensation term may include a numerical coefficient applied to a non-linear response of the MEMS sensor 102. Alternatively or in addition, coefficients may be applied to a linear response portion of the polynomial expression. Further, in such examples numerical coefficients may be determined over time, such as in a calibration process involving application of temperature-input signal pairs over time, e.g., as described above in FIG. 5. In some example approaches, compensation terms determined in a calibration process may be used in a compensation function, such that the compensation term is equal to a quantity of temperature-signal pairs used in the calibration process. In other examples, a compensation term may be less than a quantity of one or more of the temperature-signal pairs, such that an effect of the compensation term is reduced.

Figure 6:
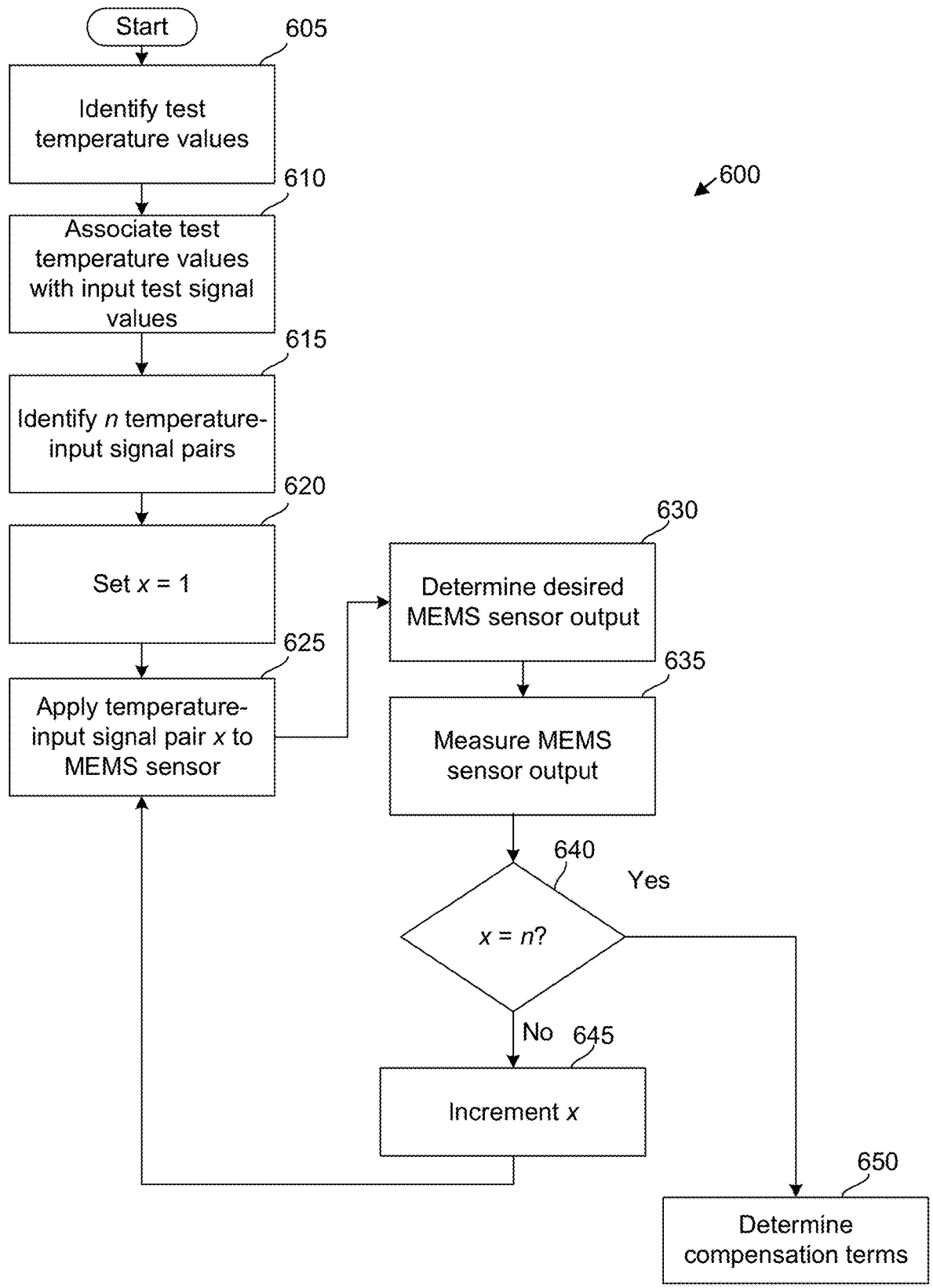
FIG. 6 shows a process flow diagram for an example method of determining compensation parameters for non-linear signal processing of a MEMS sensor, in accordance with some embodiments of the present disclosure.
Figure 7:
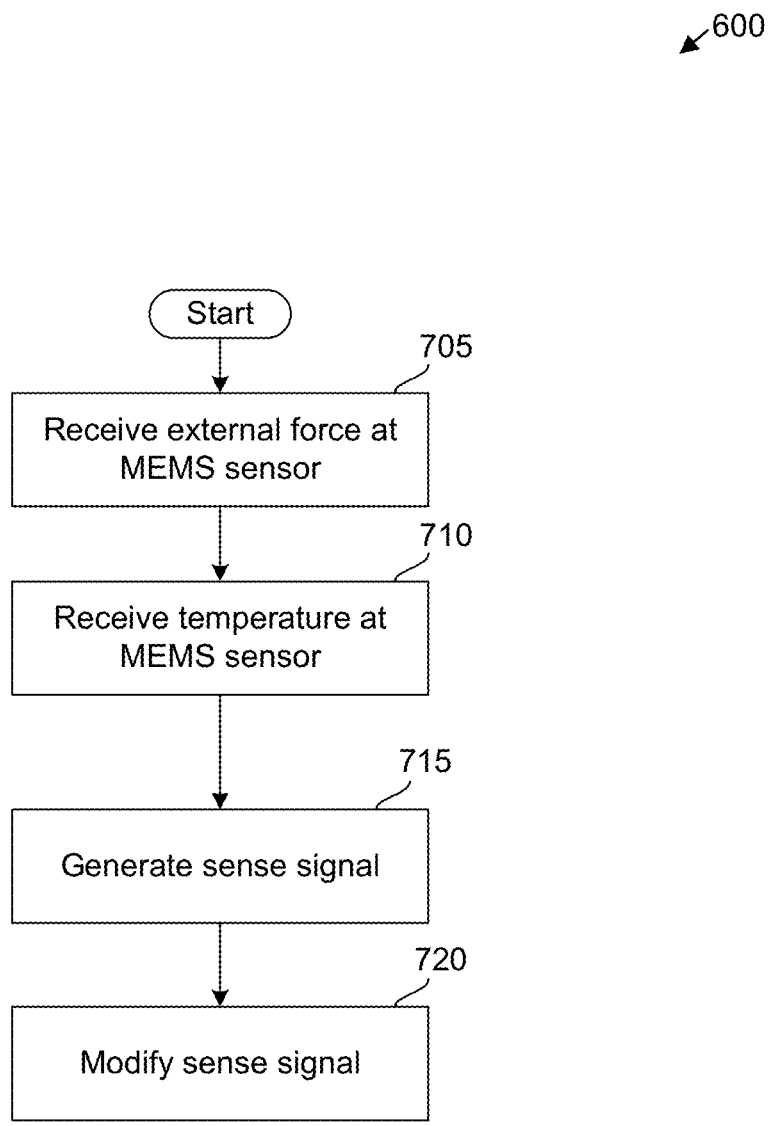
FIG. 7 shows a process flow diagram for an example method of compensating error in a MEMS sensor based on compensation terms, in accordance with some embodiments of the present disclosure.

FIG. 6 shows a process flow diagram for an example method of determining compensation parameters for non-linear signal processing of a MEMS sensor, in accordance with some embodiments of the present disclosure, using the example DoE variables described above in FIG. 5 for ease of illustration. Process 600 may be embodied in any manner that is convenient, for example by way of computer-readable instructions tangibly embodied in a memory, processor, or the like, that are included in system such as calibration system 170. Process 600 may, in one example, be embodied collectively in calibration system 170 and MEMS sensor 102. In another example, MEMS sensor 102 is placed in a test fixture configured to perform process 600. Accordingly, in these examples the test fixture may include a memory and/or processor, in which the various steps of process 600 are tangibly embodied.

Process 600 may begin at block 605, where a plurality of test temperature values is identified or selected. For example, as discussed above regarding FIG. 5, the test temperature values may include −40 degrees, 25 degrees, and 110 degrees Celsius, although any test temperature values that are convenient may be identified based upon expected operating conditions of MEMS sensor 102. Process 600 may then proceed to block 610.

At block 610, test temperature values are associated with a plurality of input test signal values. Continuing with the example described above in FIG. 5, each of the test temperature values discussed above in block 605 are associated with a plurality of input test signal values, i.e., −6 g, −3 g, 0 g, 3 g, and 6 g.

Proceeding to block 615, a plurality of temperature-input signal pairs may be identified based upon the associated test temperature values and input test signal values. In the example set forth in FIG. 5, a temperature-input signal pair may be thought of as the test temperature and resulting acceleration input to the MEMS sensor 102 based upon (a) an orientation of the MEMS sensor 102 and (b) an input signal accelerations. For example, the first temperature-input signal pair is −40 degrees Celsius and 7 g (i.e., 6 g input signal plus 1 g orientation effect), the second temperature-input signal pair is −40 degrees Celsius and −2 g (i.e., −3 g input signal plus 1 g orientation effect), the third temperature-input signal pair is −40 degrees Celsius and 4 g (i.e., 3 g input signal plus 1 g orientation effect), etc. Process 600 may then proceed to block 620.

At blocks 620-645, process 600 generally applies each of the temperature-input signal pairs identified at block 615 to a MEMS sensor 102. Initially, at block 620 a counter variable x is set to the integer one (1). Proceeding to block 625, the xth temperature-input signal pair is applied to the MEMS sensor 102. Accordingly, initially the first temperature-input signal pair is applied to the MEMS sensor 102, i.e., a test signal of 6 g, with an orientation effect of 1 g, at a temperature of −40 degrees Celsius. In should be noted that while the various temperature-test signal pairs are listed in an order, application of the temperature-test signal pairs may occur in a random fashion or order different from that illustrated in FIG. 5, thereby maximizing gaps or differences between temperature-input signal pairs being applied in consecutive steps.

Temperature-input signal pairs may be applied in any manner that is convenient. In one example approach, the MEMS sensor 102 may be exposed to an ambient temperature equal to the test temperature. A test signal value of the temperature-signal pairs be applied to a test electrode of the MEMS sensor by way of an external force that is configured to cause a movement of a proof mass of the MEMS sensor corresponding to the test signal value. A test fixture may be used to apply a known external force to the MEMS sensor 102. Continuing with the example of the first temperature-input signal pair of FIG. 5, initially the MEMS sensor 102 may be placed in a test fixture in an ambient temperature of −40 degrees Celsius, in an orientation such that a 1 g effect is created by gravity, i.e., such that gravity is applied to the MEMS sensor 102 in a same direction as the test input signal of 6 g. The test fixture may then apply the test input signal to MEMS sensor 102, e.g., by applying a 6 g external force to the MEMS sensor 102. Process 600 may then proceed to block 630.

At block 630, a desired output of the MEMS sensor 102 may be determined. In the first temperature-input signal pair example in FIG. 5, the desired output is equal to the vector sum of the orientation and test-signal forces applied to the MEMS sensor 102, i.e., 1 g+6 g=7 g. Process 600 may then proceed to block 635.

At block 635, an output of the MEMS sensor 102 may be measured. Any output of the MEMS sensor 102 may be monitored for this measurement that is convenient, such as a measurement of output capacitance. The measured output of the MEMS sensor 102 may also be compared with the desired output from block 630, which in the case of the first temperature-input signal pair is 7 g as noted above. As will be discussed further below, a difference between a desired output and a measured output of the MEMS sensor 102 may be used to determine compensation term(s).

Proceeding to block 640, process 600 may query whether the counting variable x is equal to the total number of temperature input pairs n. For example, after measuring output of the first temperature-input signal pair, process 600 would determine that x is not equal to n. Process 600 would thus proceed to block 645, where the counting variable x is incremented by one (1), and subsequently back to block 625 for consideration of the next temperature-input signal pair x. Process 600 may thus apply each of the temperature-input signal pairs to the MEMS sensor 102, measuring each actual output of the MEMS sensor 102 with the respective desired output, given the temperature-input signal pair. Accordingly, each of the plurality of test temperature values and the plurality of test signal values may be applied individually to the MEMS sensor 102 over a period of time, with the corresponding output signal values being measured over the same period of time.

Upon measurement of all temperature-input signal pairs, i.e., when process 600 determines that the counting variable x is equal to the number of determined temperature-input signal pairs n, process 600 may proceed to block 650.

At block 650, a plurality of compensation terms(s) may be determined. As will be discussed further below, compensation terms may generally facilitate a correction or adjustment to output of the MEMS sensor 102 based upon temperature and/or amplitude. Compensation terms may thus be determined based at least upon (a) the plurality of temperature-input signal pairs, (b) the corresponding plurality of measured output signal values, and (c) the corresponding plurality of desired output signal values. In at least some examples, compensation terms may be determined based upon a comparison of the measured output signal values with the desired output signal values. Subsequently, output of a MEMS sensor 102 may be adjusted in accordance with the compensation terms, along with a measurement of temperature or amplitude. As will also be described further below, compensation terms may be included in a polynomial function having linear and non-linear components, which function is used to compensate or correct output of MEMS sensor 102.

Compensation terms, e.g., as determined by process 600, may be stored at the MEMS sensor 102, or otherwise provided for adjusting a subsequent output of the MEMS sensor 102. Turning now to FIG. 6, a process 700 for adjusting output of a MEMS sensor 102 based upon these compensation term(s) is described in further detail.

Process 700 may begin at block 705, where an externally applied force is received at the MEMS sensor 102. For example, an externally applied force of the MEMS sensor 102 may result in movement of one or more proof masses relative to an anchor of the MEMS sensor 102, causing a change in capacitance indicative of the externally applied force.

Proceeding to block 710, a temperature signal may be received at the MEMS sensor. For example, as discussed above in FIGS. 2 and 3, temperature may be measured at the MEMS sensor 102. Process 700 may then proceed to block 715.

At block 715, a sense signal may be generated at the MEMS sensor based on the externally applied force. For example, as discussed above regarding FIG. 3, a MEMS sensor 102 may output a capacitance signal to a capacitance-to-voltage (C2V) amplifier 110. Output from the C2V amplifier 110 may be provided as input to the analog-to-digital converter 112 and decimator 114, which is received at a gain-output-sensor 116.

Proceeding to block 720, an output of the MEMS sensor 102, e.g., the sense signal, may be modified based on the compensation terms. In example approaches directed to corrections based upon temperature, the sense signal may be adjusted based upon the temperature signal received at block 710. In the example of FIGS. 2 and 3, compensation terms may be employed by an inverse non-linear GOS 124 and applied based upon temperature measurements at the MEMS sensor 102. Accordingly, adjustments based upon the compensation terms and measured temperature may be facilitated by the gain-output sensor 116.

Process 700 may generally be repeated in response to each externally applied force received at MEMS sensor 102. Accordingly, a plurality of externally applied forces and plurality of temperature signals received at the MEMS sensor 102 may result in a corresponding plurality of sense signals generated by the MEMS sensor 102. Further, a corresponding plurality of compensated sense signal values may be generated based upon the compensation terms, the plurality of sense signals, and the plurality of temperature signals.

Memoryless Compensation Function (Static/Frequency Independent Non-Linearity)

As discussed above, e.g., regarding the inverse non-linear GOS 124 of FIG. 3, some example approaches to compensation terms may employ a bi-dimensional non-linear function. A bi-dimensional non-linear function may be configured to correct for a non-linear temperature-based variation of the MEMS electromechanical structure 160 as seen in the non-linear capacitance 122. In one example approach, a bi-dimensional non-linear function may be described as:

$$y(t)=F\{x(t),T(t)\} \quad (1)$$

In equation (1), x represents physical input to the MEMS sensor 102, while y represents output from the MEMS sensor (e.g., from decimator 114).

Given a desired sensitivity represented by K, a function w=G{x, T} may be calculated such that:

$$G[y(t),T(t)]=Kx(t) \quad (2)$$

In equation (2), G is a function of GOS 116, and may represent a compensation function. Continuing with this example, the bi-dimensional non-linear function may advantageously have a stationary and memoryless characteristic as in equation (1), and thus equation (2) may be satisfied at every instant t if we build a function G such that:

$$G\{y,T\}=Kx$$

To find a solution, we may express G as a two-dimensional Taylor series in y and T to get a compensated value z:

$$z = Kx = G\{y, T\} = A_{00} + A_{10}y + A_{01}T + A_{20}y^2 + A_{11}yT + A_{02}T^2 + A_{30}y^3 + A_{21}y^2T + A_{12}yT^2 + A_{03}T^3 + \ldots = \sum_{j=0}^{N_j}\sum_{k=0}^{N_k}A_{jk}y^jT^k$$

By limiting this series to, e.g., $3^{rd}$ order, ten (10) unknown coefficients $\{g_k\}$ result that are to be calculated on each channel (i.e., ten total terms are present in a $3^{rd}$ order Taylor series: a single constant term, two first-order polynomial terms, three second-order polynomial terms, and four third-order polynomial terms). The coefficients may be calculated by testing the system at least in 10 different conditions (where a condition is a pair $\{x, T\}$ and a corresponding measured value y) and solving the resulting linear system of equations with respect to the set of unknowns $\{g_k\}$. Accordingly, the system may be tested in at least the same number of conditions as there are terms. Nevertheless, a greater number of measurements, e.g., more than 10 measurements, may result in a more robust solution according to a Least Mean Square error criterion (LMS). Merely by way of example, 45 temperature-input signal pairs are provided in FIG. 5. In general, a minimum set of polynomial terms to be used may be determined on a statistical basis, where the choice of the most relevant terms is related to the structure of the MEMS sensor 102. For example, behavior of MEMS sensor 102 may be characterized over a plurality of test cases to identify one or more terms that may be discarded.

Figure 8:
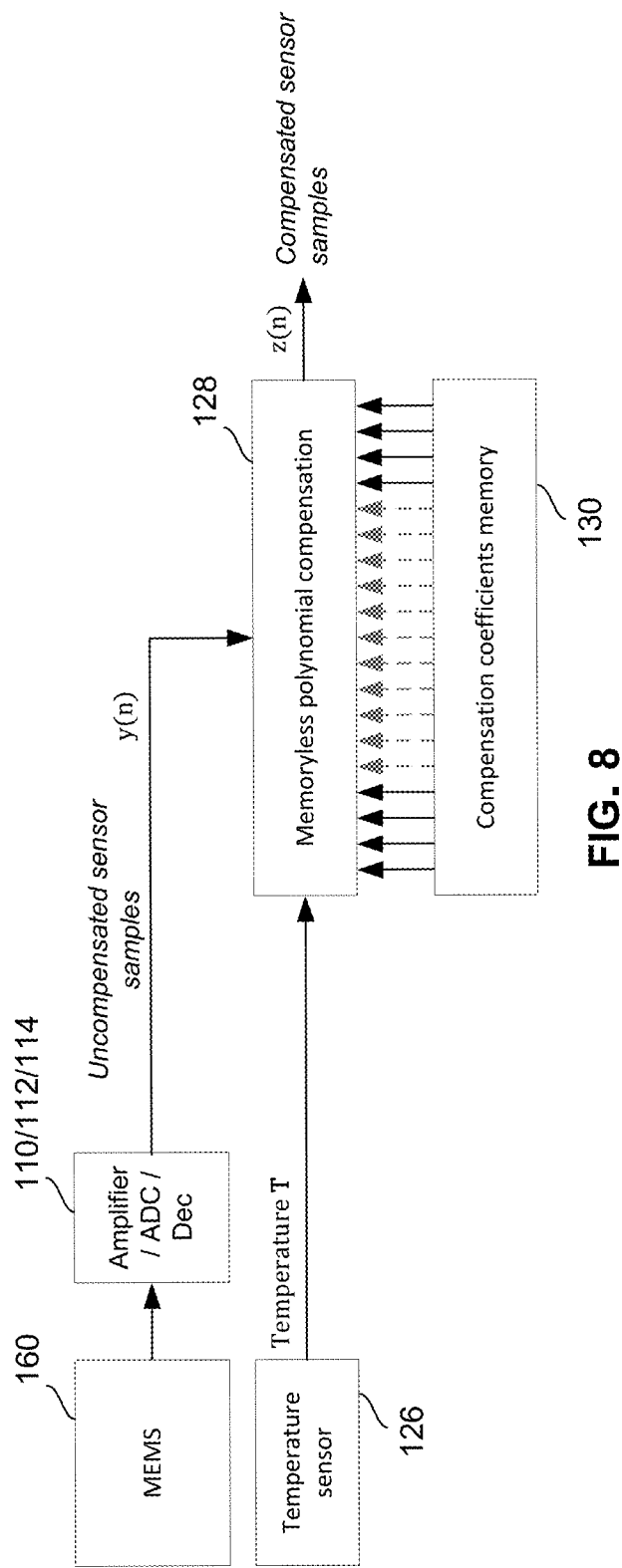
FIG. 8 shows an example block diagram for a non-linear signal processing employing a memoryless polynomial compensation, in accordance with some embodiments of the present disclosure.
Figure 9:
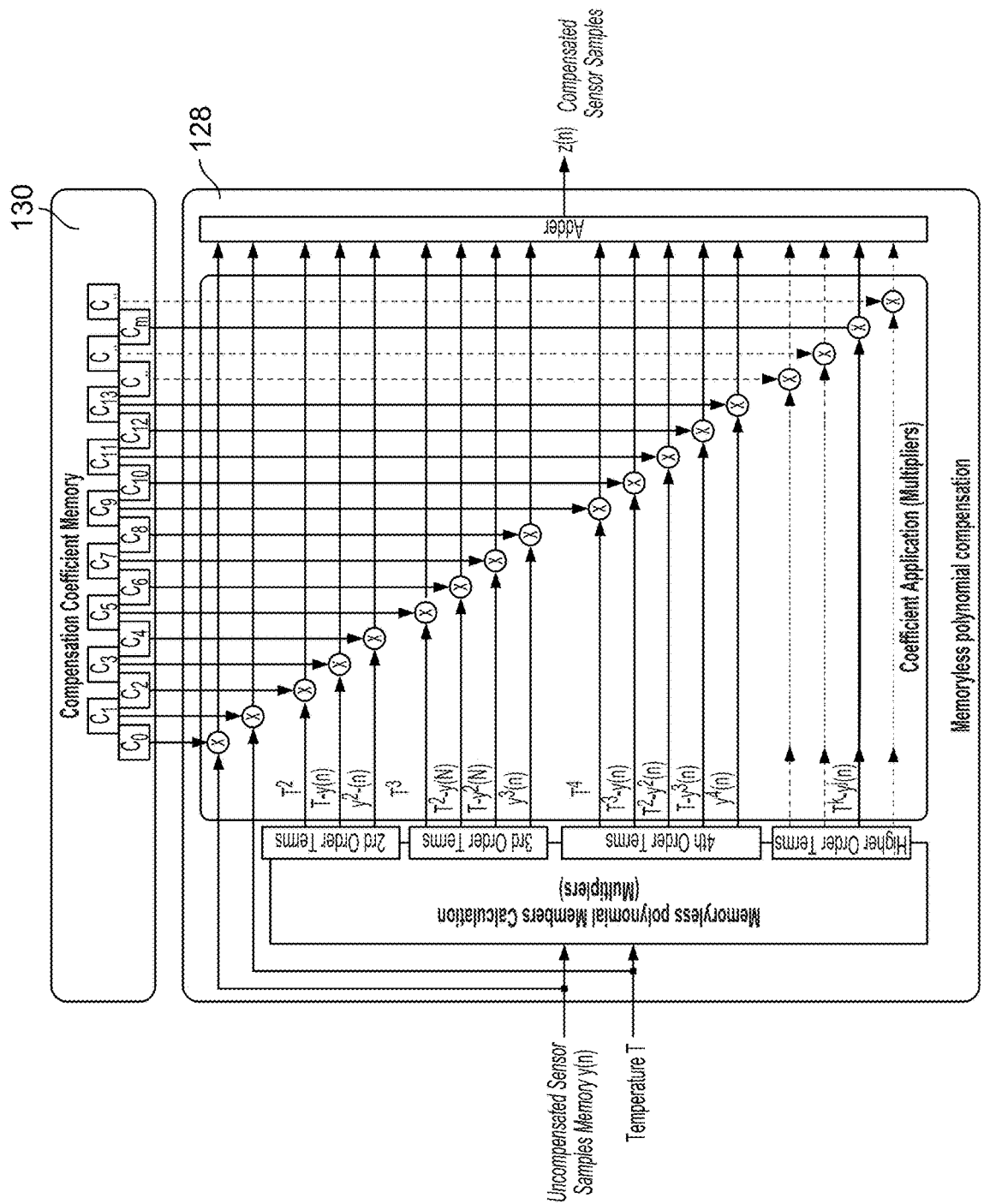
FIG. 9 shows an example compensation coefficients memory input to the memoryless polynomial compensation function of FIG. 8, in accordance with some embodiments of the present disclosure.

Turning now to FIGS. 8 and 9, a generic block diagram for a MEMS sensor employing a memoryless polynomial compensation, such as that described above, is described in further detail. Output of MEMS electromechanical structure 160 may be processed via voltage (C2V) amplifier 110, analog-digital converter (ADC) 112, and decimator 114 as illustrated in FIG. 8. Uncompensated sensor samples y(n) are provided as an input to a memoryless polynomial compensation function 128. The memoryless polynomial compensation function 128 also receives a temperature (T) input from a temperature sensor 126. The temperature sensor 126 may generally measure ambient temperature at the MEMS sensor 102. A third input to the memoryless polynomial compensation function 128 is the compensation coefficients memory 130.

The input of the compensation coefficients memory 130 to the memoryless polynomial compensation function 128 is illustrated in further detail in FIG. 9. Uncompensated sensor samples memory is input as a function y(n) to the memoryless polynomial calculation. The second, third, fourth, and any other higher order term(s) are multiplied by respective compensation coefficient memory terms $c_0, c_1, c_2 \ldots c_m$ as shown in FIG. 8, and added to create compensated sensor samples z(n).

Compensation Function with Process Memory (Frequency Dependent Non-Linearity)

Non-linearity may also be frequency dependent. In this case, the general expression of the sensor output signal may be given by the following formula:

$$y(t)=F\{x(t),\dot{x}(t),\ddot{x}(t),[\mid\$]\$\cdot\$\$[\mid\$]\$\cdot Ad\dot{x}(t), \ldots \dot{y}(t),\ddot{y}(t),\dddot{y}(t), \ldots ,T(t))\}$$

In this expression, F{ } is a non-linear function of the input signal x(t) and its derivatives, of the output signal derivatives $\dot{y}(t)$, $\ddot{y}(t)$, $\dddot{y}(t)$, . . . , and of the temperature T, whereas the derivatives of input and output signals accounts for the memory dependent part of the sensor non-linearity. In a discretized form, the previous equation becomes:

$$y(n)=H\{x(n),x(n-1),x(n-2),x(n-3), \ldots ,y(n-1),y(n-2),y(n-3), \ldots ,T(n))\}$$

In this expression, H{ } is a non-linear function of the input x(n) and its delayed samples, of the delayed samples of the output, y(n−1), y(n−2) . . . , and of the temperature T, whereas the delayed samples of input and output signals accounts for the memory dependent part of the sensor non-linearity. Therefore, the foregoing method may be extended to non-linearity with memory by adding to the Taylor series (of the function F{ }) the derivative of y and combining in a suitable polynomial form:

$$G\{y,T\}=g_0+g_1y+g_2T+g_3y^2+g_4yT+g_5T^2+g_6y^3+g_7y^2T+\\g_8yT^2+g_8T^3++p_1\dot{y}+p_2\dot{y}^2+p_3\dot{y}^3+\ldots +(p_4\dot{y}+p_5\dot{y}^2+\\p_6\dot{y}^3+\ldots )T++(q_1\ddot{y}+q_2\ddot{y}^2+q_3\ddot{y}^3+\ldots )\dddot{y}+\ldots$$

In a digital system, this means including delayed y samples. In other words, a tap line may be added, and the related terms may be mixed in a polynomial expression. Complexity increases as a result, but, as in the foregoing memoryless example, it is expected that a subset of terms can provide adequate compensation, depending on the MEMS structure:

$$G\{y(n),T\}=g_0+g_1y(n)+g_2T+g_3y^2(n)+g_4y(n)T+g_5T^2+\\g_6y^3(n)+g_7y^2(n)T+g_8y(n)T^2+g_8T^3++p_1y(n-1)+\\p_2y^2(n-1)+p_3y^3(n-1)+\ldots +(p_4y(n-1)+p_5y^2(n-1)+p_6y^3(n-1)+\ldots )T++(q_1y(n-1)+q_2y^2(n-1)+\\q_3y^3(n-1)+\ldots )y(n)+\ldots$$

The G function may be partitioned in three main blocks of terms or "modules," as follows:

Module A: The memoryless and stationary compensator, which depends upon temperature, i.e., the set of terms of type $y(n)^pT^q$ Module B: A linear equalizer, which is temperature independent, i.e., the set of terms of type y(n−k), being k≥1

Module C: A non-linear equalizer, which is memory and temperature dependent, i.e., the set of terms of type $y(n-k)^pT^q$, being k≥1, p≥1, q≥1 These modules may need to be trimmed according to a Least Mean Square error criterion (LMS). However, the linear equalizer (module B) may be in part calculated a priory, whenever any fixed transfer function in the chain is known a priori (e.g., any digital filter used in a decimation/filtering chain after AD conversion). Additionally, in one example, modules A and B may be employed as compensation terms, with the remaining terms, i.e., module C, discarded.

Figure 10A:
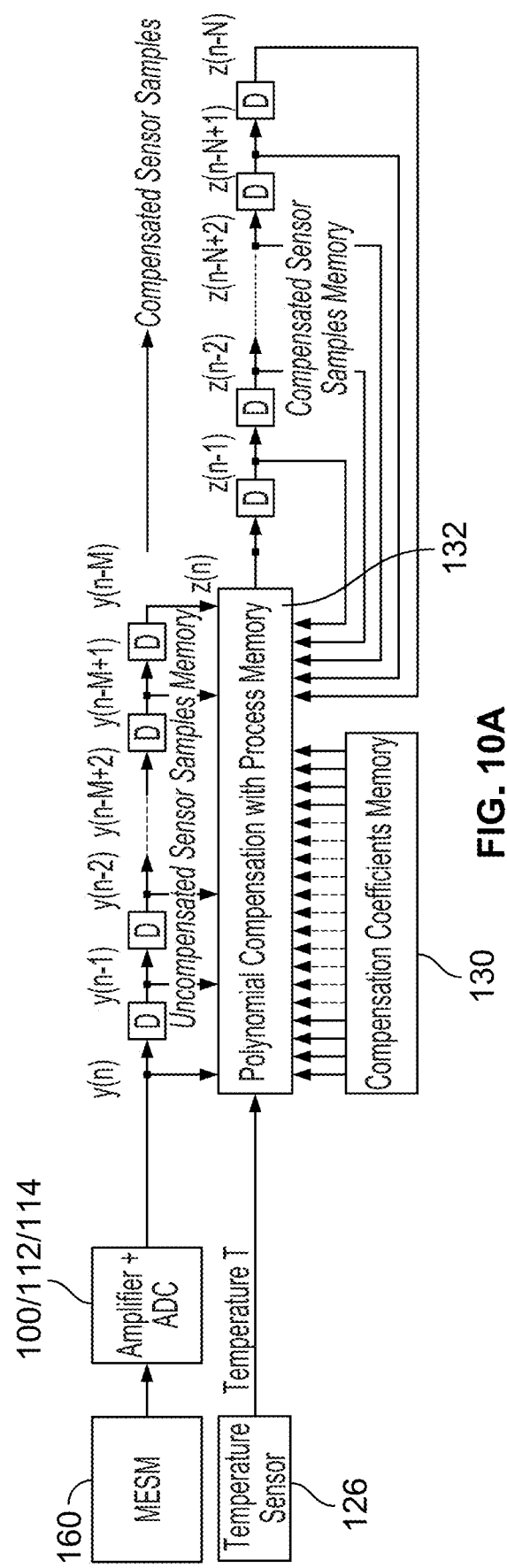
FIG. 10A shows an example block diagram for a MEMS sensor control methodology employing a polynomial compensation with process memory, in accordance with some embodiments of the present disclosure.

Turning now to FIG. 10A, an example block diagram for a MEMS sensor control methodology employing a polynomial compensation with process memory is illustrated in further detail. As shown in FIG. 10A, MEMS electromechanical structure 160 outputs a capacitance signal to the C2V 110/ADC 112/decimator 114 (illustrated as a single block in FIG. 10A for ease of illustration). The digitized output value may be input in a series to a polynomial compensation with process memory function 132. Temperature may be input from a temperature sensor 126 to the function 132. A compensation coefficients memory 130 is also provided as an input to the function 132. Compensated sensor samples are output from the function 132, as is a compensated sensor samples memory.

Figure 10B:
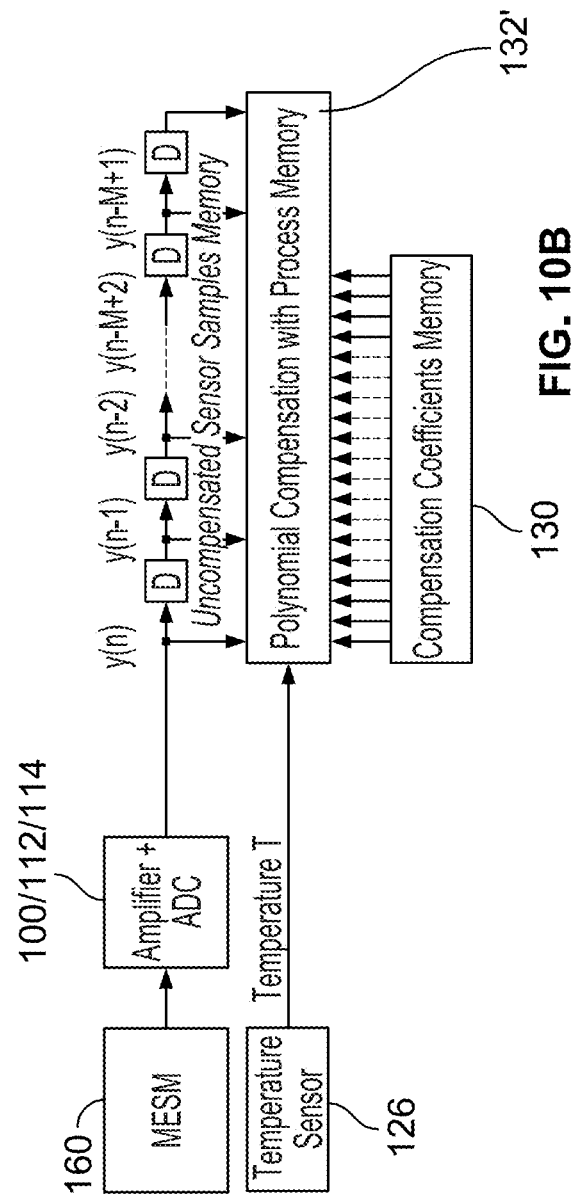
FIG. 10B shows an example block diagram for a MEMS sensor control methodology employing a polynomial compensation, in accordance with some embodiments of the present disclosure.
Figure 11:
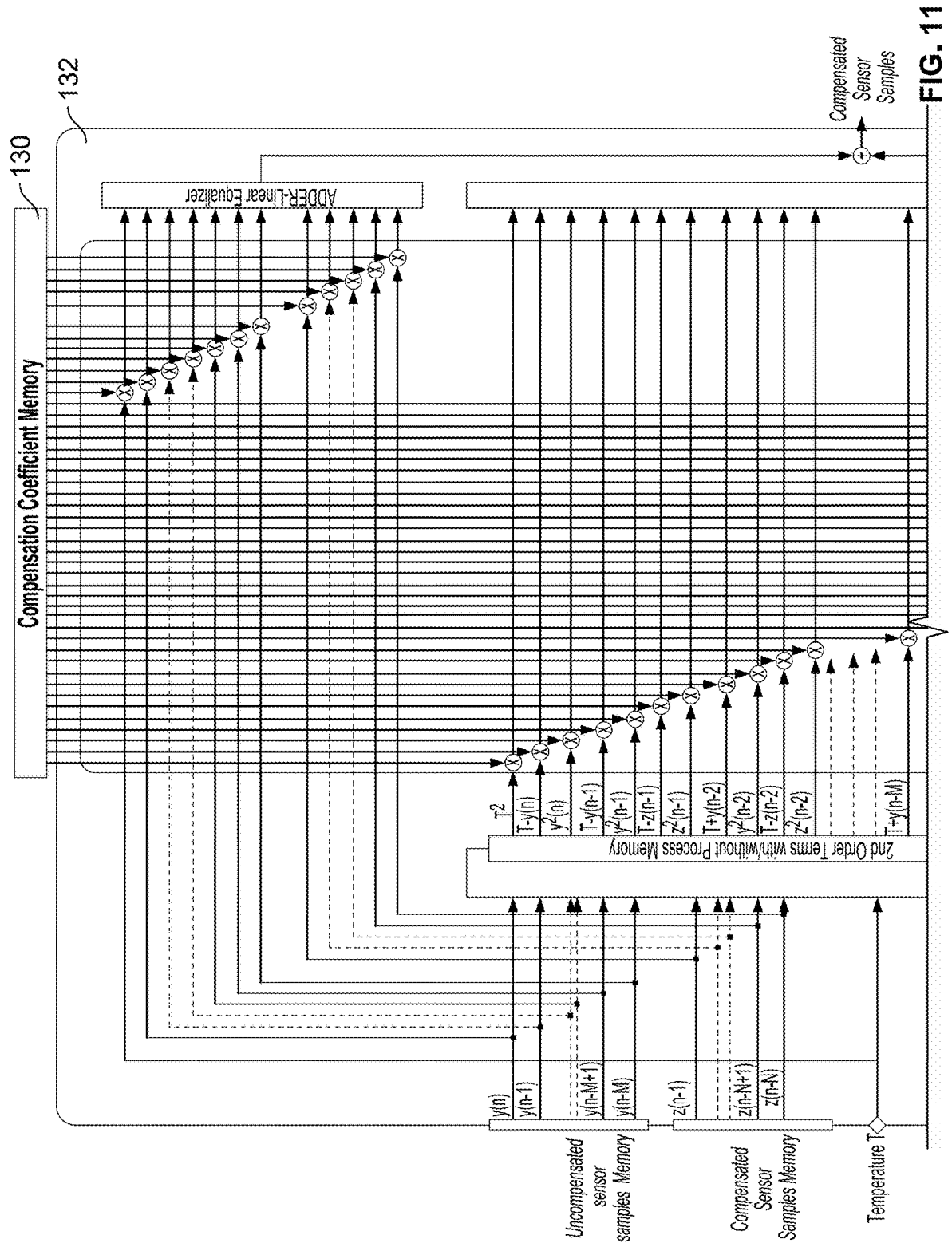
FIG. 11 shows an example compensation coefficients memory input to the polynomial compensation with process memory of FIG. 10, in accordance with some embodiments of the present disclosure.

The input of the compensation coefficients memory 130 to the polynomial compensation with process memory function 132 is illustrated in further detail in FIG. 11. An uncompensated sensor samples memory is input as a function y(n) to the polynomial compensation with process memory function 132. A compensated sensor samples memory is input as a function x(n) to the polynomial compensation with process memory function 132, along with temperature measurements from the sensor 126. The second, third, and any other higher order term(s) with or without process memory are multiplied by respective compensation coefficient memory terms, as also shown in FIG. 10, and added to create compensated sensor samples z(n). It should be noted that the compensated sensor samples memory as illustrated in FIG. 10A is not required. Merely by way of example, an alternative block diagram for a MEMS sensor control methodology employing a polynomial compensation 132' without the compensated sensor samples memory is illustrated in FIG. 10B, with like reference numbers indicating like features as those described in FIG. 10A.

Figure 12:
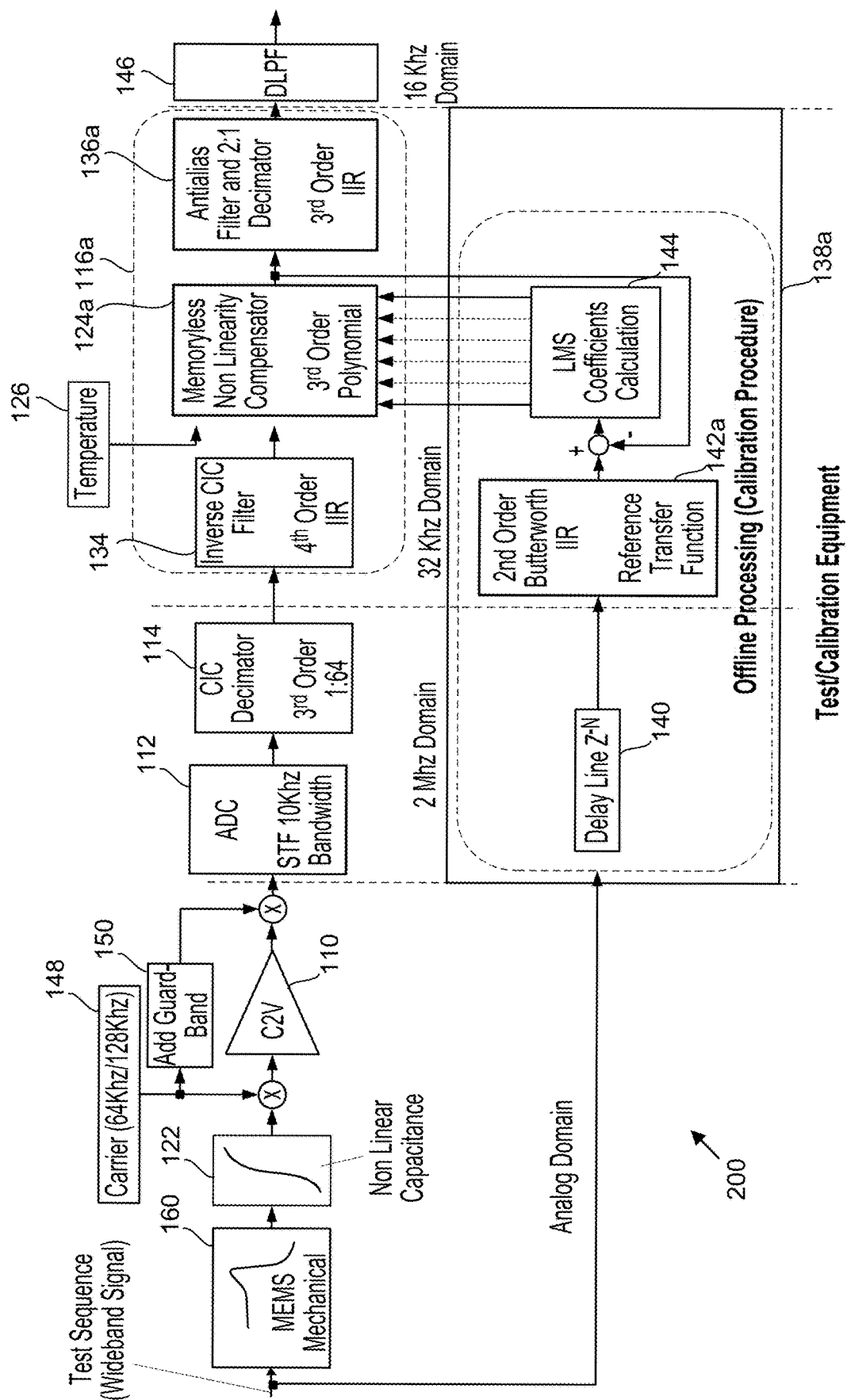
FIG. 12 shows exemplary calibration circuitry in a testing sequence, according to some embodiments of the present disclosure.

Turning now to FIG. 12, an example MEMS system 200 is shown, which may be calibrated with compensation terms or a compensation function consistent with the example illustrations described above. The MEMS system 200 is shown with MEMS sensor 102 having an output non-linear capacitance 122, which is input to a capacitance-to-voltage amplifier 110. A carrier 148 and add guard-band 150 are input to the input and output of the amplifier 110, respectively, with the output from the amplifier 110 being input to ADC 112. Output of the ADC 112 is provided to a decimator 114. In the example illustrated in FIG. 11, the decimator 114 is a cascaded integrator comb (CIC) decimator.

Output from the decimator 114 is input to gain output signal (GOS) block 116a. The GOS 116a generally compensates frequency dependent non-linearities resulting from the MEMS sensor 102. More particularly, GOS 116 employs module A described above (i.e., polynomial memoryless nonlinear compensator) to compensate the non-linearities of the MEMS sensor 102. The GOS 116a also includes Module B described above, i.e., a theoretical ("a priori") linear equalizer. The GOS 116a may receive output of the decimator 114 at an inverse CIC filter to compensate (in a certain band) for attenuation introduced by the CIC decimator filter of the decimator 114, e.g., at high frequencies. While not shown in the example of FIG. 11, a finite impulse response (FIR) non-linear equalizer may be provided to shape the overall transfer function by way of a reference transfer function or reference model. In such examples, the FIR non-linear equalizer may be included as part of the processing of higher-order terms of the polynomial compensation function 132 illustrated in FIG. 11. Output from the memoryless inverse non-linearity GOS 124a may be provided to an anti-aliasing filter (e.g., an IIR filter, $3^{rd}$-order Chebyshev type 2 in this example), with a 2:1 decimation (32 Khz to 16 Khz, in the example shown in FIG. 12). The compensated signal is output to a digital low-pass filter (DLPF) 146. It should be noted that if no equalization is included, i.e., only the polynomial compensation is used, system 200 corrects only static non-linearities of the MEMS sensor 102.

Initially, calibration processing circuitry 138a may receive input from the test sequence. The calibration processing circuitry 138a may also determine coefficients that are provided to the memoryless inverse non-linear GOS 124a. In the example shown in FIG. 11, a test sequence, e.g., temperature-input signal pairs, are provided to a delay line 140. Output from the delay line 140 is input to a reference transfer function 142a, which is input to a coefficients calculation 144. The coefficients calculation 144 also receives input from the memoryless inverse non-linear GOS 124a, which is subtracted from the output of the reference transfer function 142a.

Figure 13:
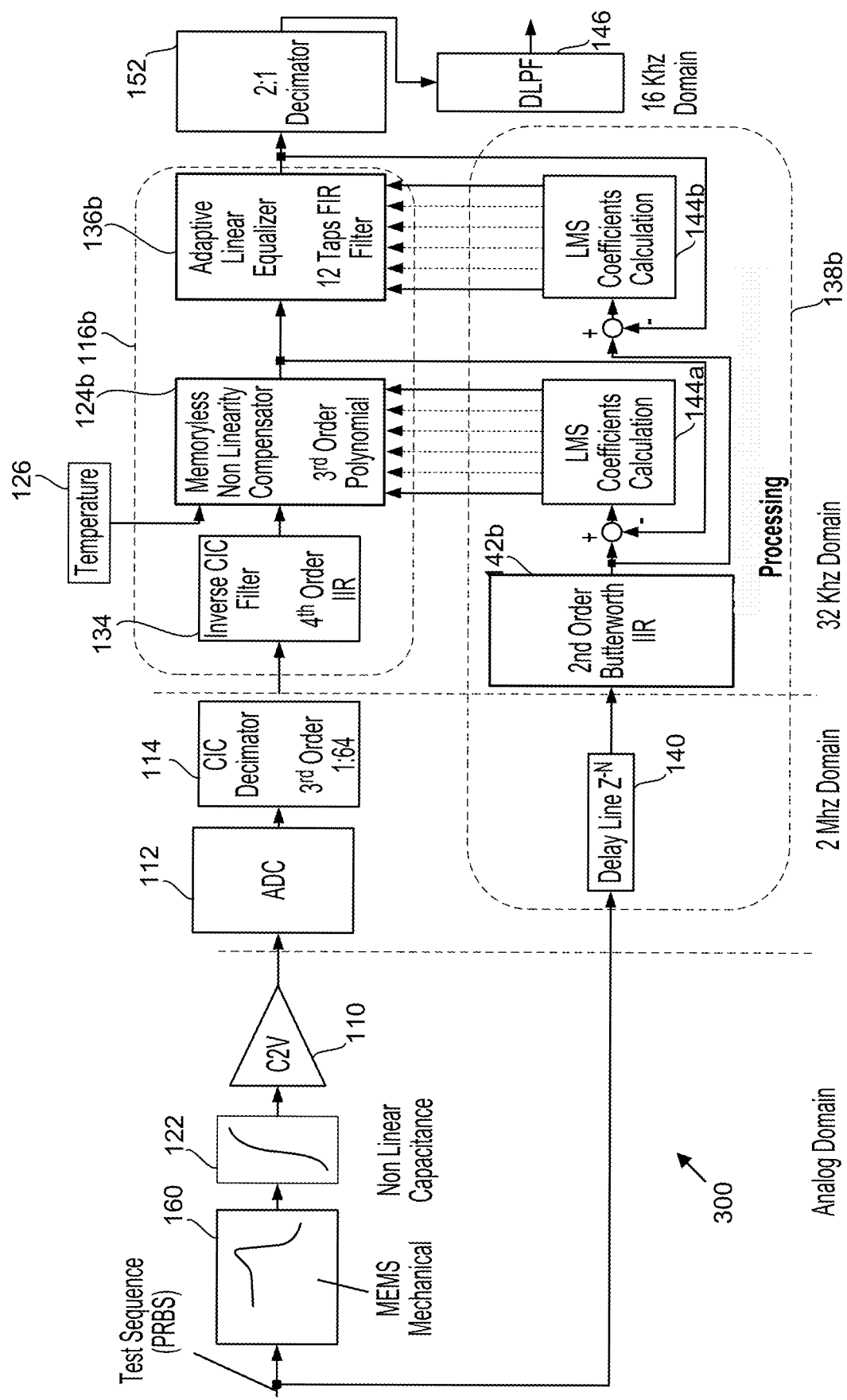
FIG. 13 shows the example calibration circuitry of FIG. 12 in another testing sequence, according to some embodiments of the present disclosure.

Turning now to FIG. 13, another example MEMS system 300 is shown. As with system 200, the system 300 may also be calibrated with compensation terms or a compensation function such as those provided the above examples. The MEMS system 300 is shown with MEMS electromechanical structure 160 of a MEMS sensor 102 having an output non-linear capacitance 122, which is input to a capacitance-to-voltage amplifier 110. Output from the amplifier 110 is input to ADC 112. Output of the ADC 112 is provided to a decimator 114, which in the example illustrated is a cascaded integrator comb (CIC) decimator.

Gain output signal (GOS) block 116b receives the output of the decimator 114, and generally compensates frequency dependent non-linearities resulting from the MEMS sensor 102. As with the GOS 116a illustrated in FIG. 11 and described above, GOS 116b employs module A (i.e., polynomial memoryless nonlinear compensator) to compensate the non-linearities of the MEMS sensor 102 and Module B described above, i.e., a theoretical ("a priori") linear equalizer. The GOS 116b may receive output of the decimator 114 at an inverse CIC filter to compensate (in a certain band) for attenuation introduced by the CIC decimator filter of the decimator 114, e.g., at high frequencies. Output from the memoryless inverse non-linear GOS 124b may be provided to an adaptive linear equalizer 136b. The compensated signal is output to a 2:1 decimator, which outputs to a digital low-pass filter (DLPF) 146.

Calibration processing circuitry 138b may receive input from the test sequence to determine coefficients that are provided to the memoryless non-linearity compensator 124b. In the example shown in FIG. 12, a test sequence, e.g., temperature-input signal pairs, are provided to a delay line 140. Output from the delay line 140 is input to a Butterworth Infinite Impulse Response (IIR) filter 142b, which is input to coefficients calculation blocks 144a, 144b. More specifically, a first coefficients calculation 144a receives input from the memoryless non-linearity compensator 124b, which is subtracted from the output of the Butterworth IIR filter 142b. Coefficients determined at the block 144a are provided to the memoryless non-linearity compensator 124b. Output from the Butterworth IIR filter 142 is also provided to a second coefficients calculation 144b as an input, from which output of the adaptive linear equalizer 136b is subtracted. Coefficients determined at block 144b are provided to the adaptive linear equalizer 136b.

In one example application of the foregoing GOS architecture, an improved capability of correcting non-linear and temperature variations for both offset and sensitivity was demonstrated. Non-linear compensation functions such as those described in the foregoing examples demonstrated improved performance, e.g., by reducing MEMS measurement error spread. In one example, a ratio of 1.74 on the x-axis, 1.8 on the y-axis, and 2.17 on the z-axis resulted, with respect to an uncompensated device. Residual offset due to high frequency vibration resulting from a high acceleration profile was reduced over 80% from a worst case at high temperature of 100 milligees (mgee) to less than 20 mgee. These example GOS architectures were calibrated using the above-described temperature-input signal pairs. Additionally, offset (i.e., a magnitude of sensitivity and offset error) caused by vibrations was reduced 1.7 to 2.1 times after completion of the compensation process, in comparison to a piecewise linear approach.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for compensation of a microelectromechanical system (MEMS) sensor, comprising:
associating a plurality of test temperature values with a plurality of input test signal values;
identifying, based on the associating, a plurality of temperature-input signal pairs;
applying, for each of the temperature-input signal pairs, one of the plurality of test temperature values and one of the plurality of test signal values to the MEMS sensor;
determining a plurality of desired output signal values, wherein each of the desired output signal values corresponds to one of the applied temperature-input signal pairs;
measuring a plurality of measured output signal values from the MEMS sensor, wherein each of the measured output signal values corresponds to one of the applied temperature-input signal pairs;
determining, based on the plurality of temperature-input signal pairs, the corresponding plurality of measured output signal values, and the corresponding plurality of desired output signal values, a plurality of compensation terms; and
providing the plurality of compensation terms for storage at the MEMS sensor, wherein a sense signal of the MEMS sensor is modified based on the plurality of compensation terms.

2. The method of claim 1, wherein a quantity of the plurality of compensation terms is equal to a quantity of the plurality of temperature-signal pairs.

3. The method of claim 1, wherein a quantity of the plurality of compensation terms is less than a quantity of the plurality of temperature-signal pairs.

4. The method of claim 1, further comprising a polynomial expression that associates the plurality of compensation terms to the test temperature values and the input test signal values.

5. The method of claim 4, wherein the compensation terms correspond to a linear portion of the polynomial expression.

6. The method of claim 4, wherein the compensation terms include a linear set of numerical values or coefficients and a non-linear set of numerical values or coefficient.

7. The method of claim 1, wherein applying the plurality of test temperature values and the plurality of test signal values to the MEMS sensor comprises applying each of the temperature-signal pairs over a period of time and measuring the plurality of measured output signal values from the MEMS sensor comprises measuring a plurality of measured output signal values for each of the temperature-signal pairs over the time period.

8. The method of claim 7, wherein a subset of the plurality of compensation terms correspond to a non-linear response of the MEMS sensor.

9. The method of claim 8, wherein the subset of the plurality of compensation terms is determined based on the response of the MEMS sensor to each of the temperature-signal pairs over the time period.

10. The method of claim 9, further comprising a polynomial expression that associates the plurality of compensation terms to temperature values and test signal values over the time period.

11. The method of claim 1, further comprising:
receiving, at the MEMS sensor, an externally applied force;
generating, at the MEMS sensor based on the externally applied force, the sense signal; and
modifying, at the MEMS sensor, the sense signal based on the compensation terms.

12. The method of claim 11, wherein the associating, identifying, measuring, determining, and providing are performed by the MEMS sensor.

13. The method of claim 12, wherein applying the test signal values of the temperature-signal pairs comprises applying, by a test electrode of the MEMS sensor for each of the temperature-signal pairs, a force that causes a movement of a proof mass of the MEMS sensor, wherein the movement corresponds to the test signal value.

14. The method of claim 13, wherein applying the test temperature values of the temperature-signal pairs comprises applying, by a test fixture external to the MEMS sensor for each of the temperature-signal pairs, the test temperature values to the MEMS sensor.

15. The method of claim 11, further comprising:
receiving, at the MEMS sensor, a temperature signal; and
modifying, at the MEMS sensor, the sense signal based on the compensation terms and the temperature signal.

16. The method of claim 1, wherein the MEMS sensor comprises an accelerometer, a gyroscope, a pressure sensor, a microphone, or an ultrasonic fingerprint sensor.

17. The method of claim 1, wherein the associating, identifying, measuring, determining, and providing are performed by a test fixture.

18. The method of claim 1, further comprising:
receiving, at the MEMS sensor, a plurality of externally applied forces;
generating, at the MEMS sensor based on the externally applied forces, a plurality of sense signals;
receiving, at the MEMS sensor, a plurality of temperature signals, wherein each of the plurality of temperature signals is associated with one of the plurality sense signals; and
generating, by the MEMS sensor, a plurality of compensated sense signal values based on the compensation terms, the plurality of sense signals, and the plurality of temperature signals.

19. The method of claim 18, further comprising determining a plurality of new desired output values for the plurality of sense signals and the plurality of temperature signals, wherein the plurality of compensated sense signal values differ from the new desired output values by less than a predefined error limit.

20. A compensating system for a microelectromechanical (MEMS) sensor, the compensating system comprising:
a processor in communication with the MEMS sensor and having a temperature measurement input; and
a memory in communication with the processor, the memory including:
digital data stored on the memory, the digital data comprising a plurality of test temperature values associated with a plurality of input test signal values; and instructions tangibly embodied in the memory, the instructions configured to cause the processor to:

identify, based upon the associated test temperature values and input test signal values, a plurality of temperature-input signal pairs;

apply, for each of the temperature-input signal pairs, one of the plurality of test temperature values and one of the plurality of test signal values to the MEMS sensor output;

determine a plurality of desired output signal values, wherein each of the desired output signal values corresponds to one of the applied temperature-input signal pairs;

measure a plurality of measured output signal values from the MEMS sensor, wherein each of the measured output signal values corresponds to one of the applied temperature-input signal pairs;

determine, based on the plurality of temperature-input signal pairs, the corresponding plurality of measured output signal values, and the corresponding plurality of desired output signal values, a plurality of compensation terms; and provide the plurality of compensation terms for storage at the MEMS sensor, wherein a sense signal of the MEMS sensor is modified based on the plurality of compensation terms.

* * * * *